(12) United States Patent  
Reed et al.

(10) Patent No.: US 9,311,687 B2
(45) Date of Patent: *Apr. 12, 2016

(54) REDUCING WATERMARK PERCEPTIBILITY AND EXTENDING DETECTION DISTORTION TOLERANCES

(71) Applicant: Digimarc Corporation, Beaverton, OR (US)

(72) Inventors: Alastair M. Reed, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,080

(22) Filed: Oct. 28, 2014

(65) Prior Publication Data

US 2015/0110341 A1   Apr. 23, 2015

Related U.S. Application Data

(63) Continuation of application No. 13/933,814, filed on Jul. 2, 2013, now Pat. No. 8,873,797, which is a continuation of application No. 13/042,212, filed on Mar. 7, 2011, now Pat. No. 8,477,990.

(60) Provisional application No. 61/311,218, filed on Mar. 5, 2010.

(51) Int. Cl.
*G06K 9/00*   (2006.01)
*H04N 7/167*   (2011.01)
*G06T 1/00*   (2006.01)

(52) U.S. Cl.
CPC ............... *G06T 1/0021* (2013.01); *G06K 9/00* (2013.01)

(58) Field of Classification Search
USPC ......... 382/100, 112–113, 116, 135–140, 168, 382/189, 194, 203, 219, 232, 235, 243, 250, 382/260, 274, 276, 305, 312; 357/3.11; 380/201, 246; 399/366; 709/217
See application file for complete search history.

(56) References Cited

U.S. PATENT DOCUMENTS 5,790,703 A   8/1998   Wang
5,835,639 A   11/1998   Honsinger et al.
(Continued)

FOREIGN PATENT DOCUMENTS

WO   WO9953428   10/1999
WO   WO0007356   2/2000
(Continued)

OTHER PUBLICATIONS

US. Appl. No. 61/311,218, filed Mar. 5, 2010.
(Continued)

*Primary Examiner* — Seyed Azarian
(74) *Attorney, Agent, or Firm* — Digimarc Corporation

(57) ABSTRACT

The present disclosures relates generally to digital watermarking and data hiding. One claim recites an apparatus comprising: means for storing a watermark signal; means for embedding a watermark signal in a first portion of a video signal; means for preconditioning the watermark signal in a first manner to allow expanded detection of said preconditioned watermark signal in the presence of first distortion; means for embedding the watermark signal preconditioned in the first manner in a second portion of the video signal; means for preconditioning the watermark signal in a second manner to allow expanded detection of said preconditioned watermark signal in the presence of second distortion; and means for embedding the watermark signal preconditioned in the second manner in a third portion of the video signal. Of course, other claims are provided too.

16 Claims, 9 Drawing Sheets

(56) References Cited

U.S. PATENT DOCUMENTS

| | | | |
|---|---|---|---|
| 5,848,155 | A | 12/1998 | Cox et al. |
| 5,862,260 | A | 1/1999 | Rhoads |
| 5,949,055 | A | 9/1999 | Fleet et al. |
| 5,991,426 | A | 11/1999 | Cox et al. |
| 6,052,486 | A * | 4/2000 | Knowlton ......... G06F 17/30873 382/232 |
| 6,108,434 | A | 8/2000 | Cox |
| 6,122,403 | A * | 9/2000 | Rhoads ............ G06F 17/30876 382/233 |
| 6,311,214 | B1 * | 10/2001 | Rhoads ............ G06F 17/30876 380/255 |
| 6,332,031 | B1 * | 12/2001 | Rhoads ................ G06T 1/0071 380/232 |
| 6,345,104 | B1 * | 2/2002 | Rhoads ............. G06K 9/00442 283/74 |
| 6,360,000 | B1 | 3/2002 | Collier |
| 6,408,082 | B1 | 6/2002 | Rhoads et al. |
| 6,449,377 | B1 | 9/2002 | Rhoads |
| 6,571,144 | B1 | 5/2003 | Moses et al. |
| 6,590,996 | B1 | 7/2003 | Reed et al. |
| 6,614,914 | B1 | 9/2003 | Rhoads et al. |
| 6,718,046 | B2 | 4/2004 | Reed et al. |
| 6,728,390 | B2 | 4/2004 | Rhoads et al. |
| 6,738,744 | B2 | 5/2004 | Kirovski et al. |
| 6,763,123 | B2 | 7/2004 | Reed et al. |
| 6,788,801 | B2 | 9/2004 | Liao et al. |
| 6,891,959 | B2 | 5/2005 | Reed et al. |
| 6,901,236 | B2 * | 5/2005 | Saitoh .................... G06F 21/10 382/181 |
| 6,912,295 | B2 | 6/2005 | Reed et al. |
| 6,947,571 | B1 | 9/2005 | Rhoads et al. |
| 7,027,614 | B2 | 4/2006 | Reed |
| 7,068,297 | B2 | 6/2006 | Jones et al. |
| 7,116,781 | B2 | 10/2006 | Rhoads |
| 7,203,355 | B2 | 4/2007 | Levi et al. |
| 7,218,751 | B2 | 5/2007 | Reed |
| 7,227,671 | B2 | 6/2007 | Zolla |
| 7,391,880 | B2 | 6/2008 | Reed et al. |
| 7,446,891 | B2 | 11/2008 | Haas |
| 7,738,673 | B2 | 6/2010 | Reed |
| 7,970,167 | B2 | 6/2011 | Rhoads |
| 7,991,157 | B2 | 8/2011 | Rhoads |
| 7,995,790 | B2 | 8/2011 | Reed et al. |
| 8,027,506 | B2 | 9/2011 | Rhoads |
| 8,027,509 | B2 | 9/2011 | Reed et al. |
| 8,050,452 | B2 | 11/2011 | Bradley et al. |
| 8,094,869 | B2 | 1/2012 | Reed et al. |
| 8,103,877 | B2 | 1/2012 | Hannigan et al. |
| 8,165,342 | B2 | 4/2012 | Reed et al. |
| 8,175,617 | B2 | 5/2012 | Rodriguez |
| 8,199,969 | B2 | 6/2012 | Reed |
| 8,243,980 | B2 | 8/2012 | Rhoads et al. |
| 8,355,514 | B2 | 1/2013 | Rhoads |
| 8,412,577 | B2 | 4/2013 | Rodriguez |
| 8,477,990 | B2 | 7/2013 | Reed et al. |
| 8,509,472 | B2 | 8/2013 | Rodriguez et al. |
| 8,533,481 | B2 | 9/2013 | Petrovic |
| 8,744,120 | B2 | 6/2014 | Reed et al. |
| 2001/0032315 | A1 | 10/2001 | Van Overveld |
| 2002/0067844 | A1 | 6/2002 | Reed et al. |
| 2005/0031159 | A1 | 2/2005 | Rhoads |
| 2007/0196024 | A1 | 8/2007 | Tian |
| 2008/0298632 | A1 | 12/2008 | Reed |
| 2010/0150396 | A1 | 6/2010 | Reed |
| 2010/0150434 | A1 | 6/2010 | Reed |
| 2010/0322467 | A1 | 12/2010 | Reed et al. |
| 2011/0098029 | A1 | 4/2011 | Rhoads et al. |
| 2012/0076344 | A1 | 3/2012 | Reed |
| 2012/0099758 | A1 | 4/2012 | Reed |
| 2012/0099759 | A1 | 4/2012 | Reed |

FOREIGN PATENT DOCUMENTS

| | | |
|---|---|---|
| WO | WO0171960 | 9/2001 |
| WO | WO02089056 | 11/2002 |
| WO | WO2013067439 | 5/2013 |

OTHER PUBLICATIONS de Ipina, TRIP: a Low-Cost Vision-Based Location System for Ubiquitous Computing, Personal and Ubiquitous Computing, vol. 6, No. 3, May 2002, pp. 206-219.

Dec. 5, 2012 Notice of Appeal; Jun. 5, 2012 Final Rejection; May 16, 2012 Amendment; and Nov. 16, 2011 Office Action; all from assignee's U.S. Appl. No. 12/337,029.

O'Ruanaidh, "Rotation, Scale and Translation Invariant Digital Image Watermarking," Signal Processing, pp. 2-15, May 1, 1998.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979.

Cox, et. al., "Digital Watermarking," 2002 by Academic Press, pp. 247-252.

Chu, et al., "Luminance channel modulated watermarking of digital images," SPIE vol. 3723 (1999).

* cited by examiner

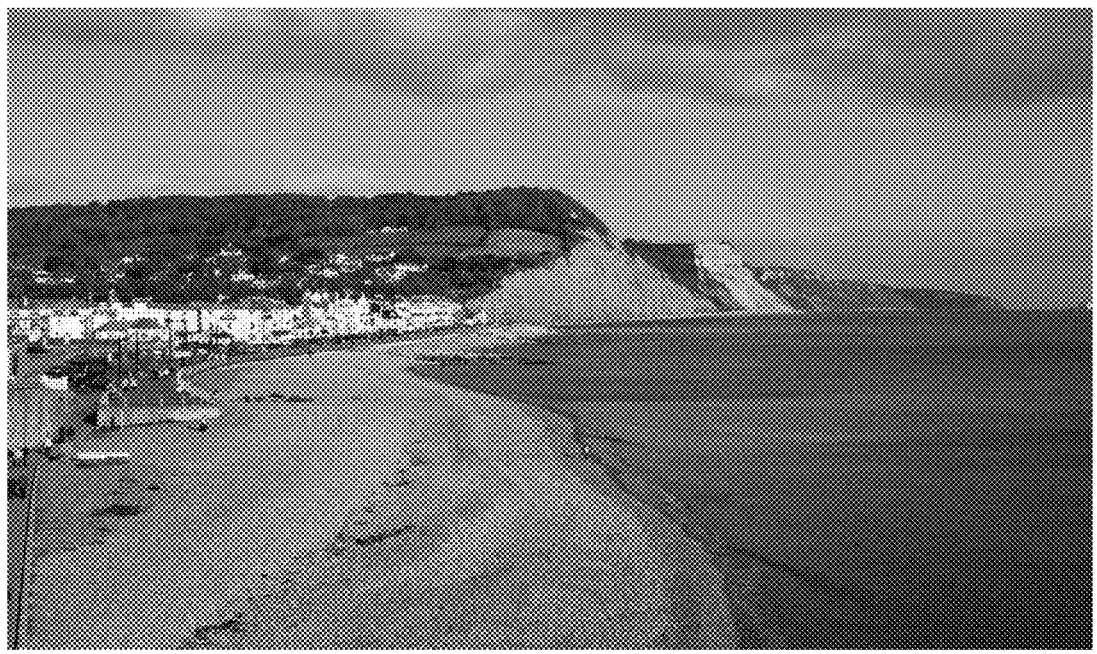
Fig. 1
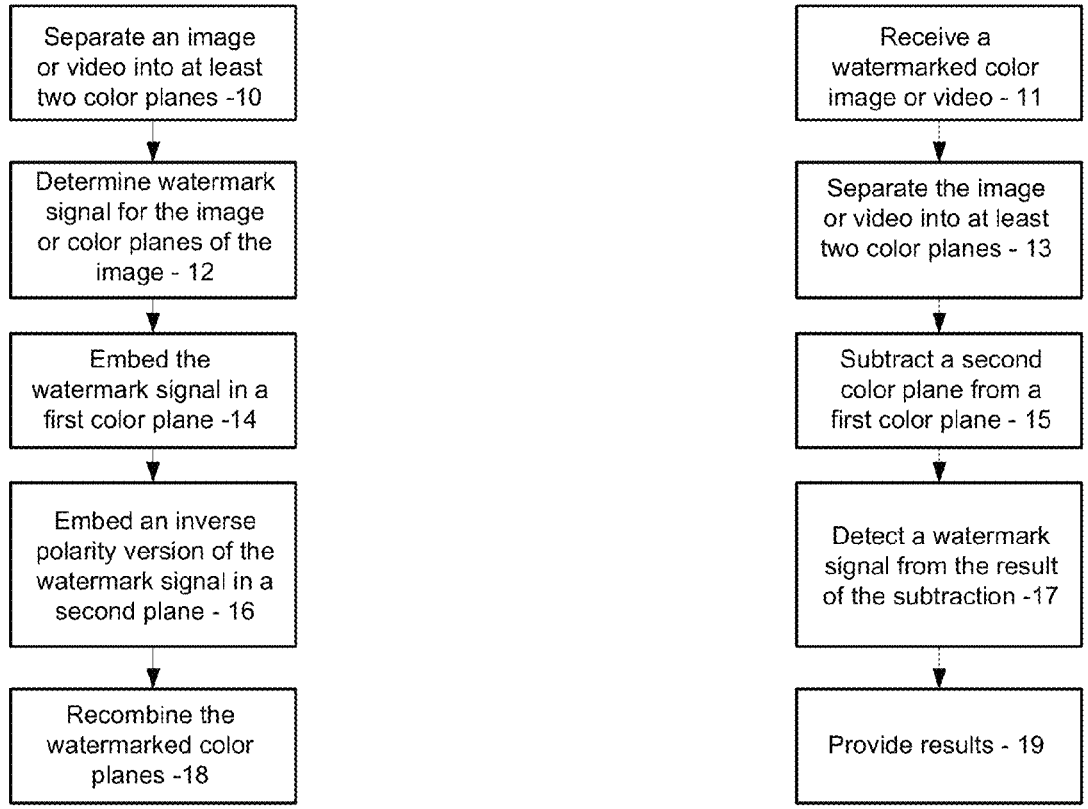
Fig. 10a                    Fig. 10b

FIG. 12
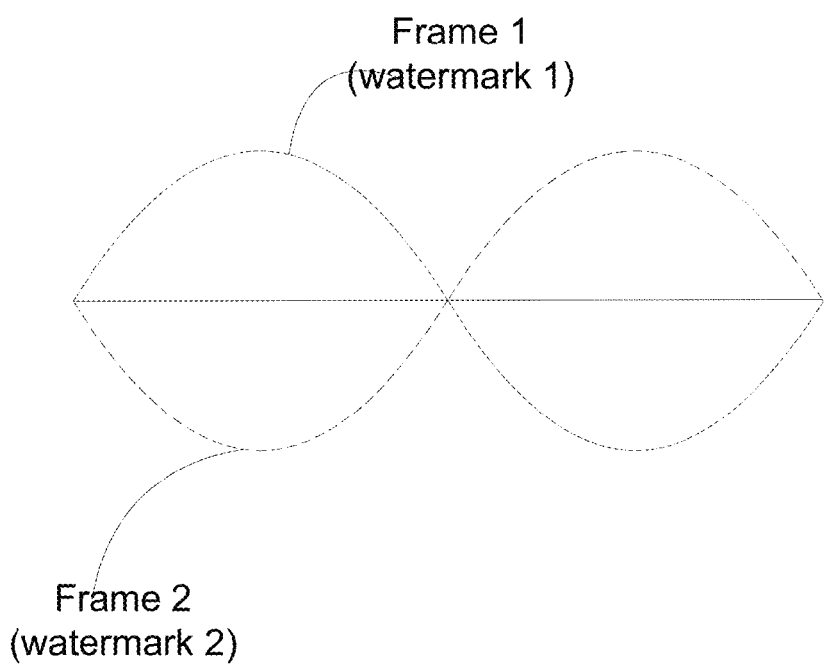
Frame 1 (watermark 1)
Frame 2 (watermark 2)
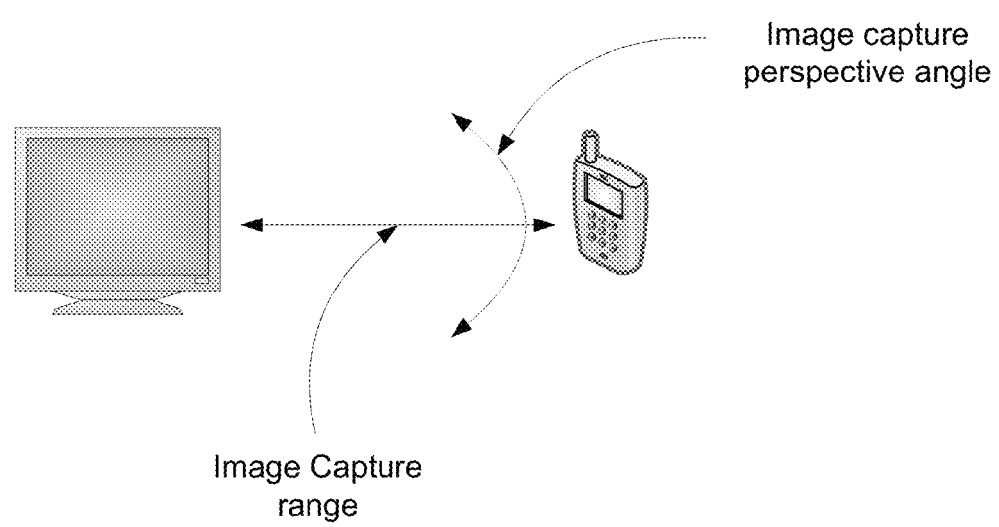
Image capture perspective angle
Image Capture range
FIG. 13

FIG. 14
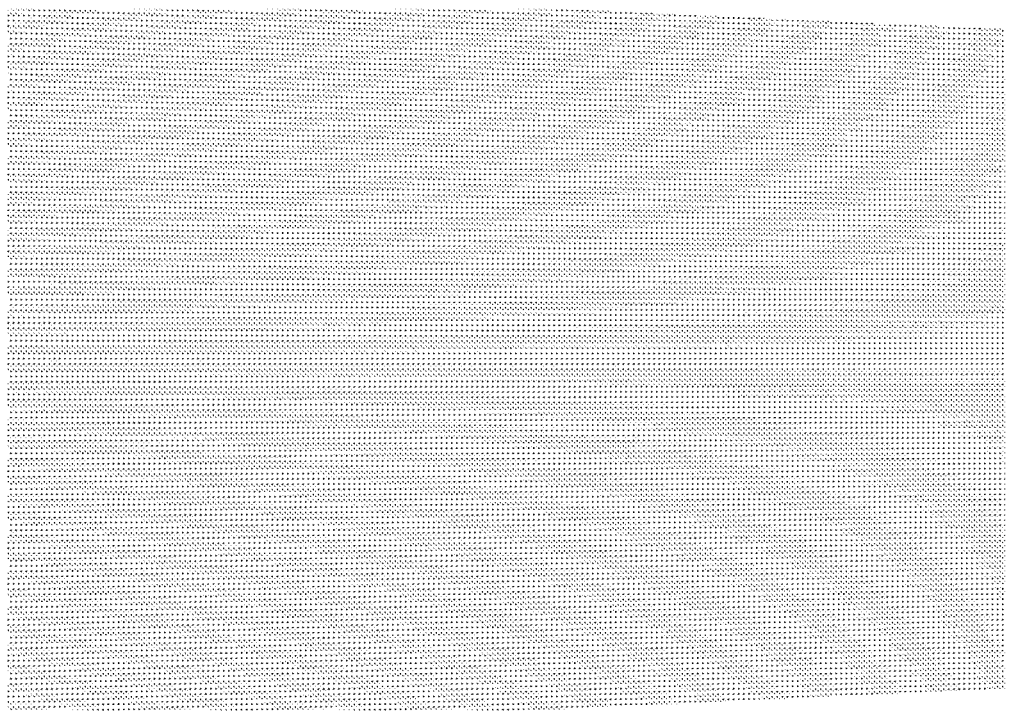
FIG. 15

REDUCING WATERMARK PERCEPTIBILITY AND EXTENDING DETECTION DISTORTION TOLERANCES

RELATED APPLICATION DATA

This application is a continuation of U.S. application Ser. No. 13/933,814, filed Jul. 2, 2013 (now U.S. Pat. No. 8,873, 797), which is a continuation of U.S. application Ser. No. 13/042,212, filed Mar. 7, 2011 (now U.S. Pat. No. 8,477,990), which claims the benefit of U.S. Provisional Application No. 61/311,218, filed Mar. 5, 2010. This application is related to U.S. patent application Ser. No. 12/634,505, filed Dec. 9, 2009 (published as US 2010-0150396 A1); Ser. No. 12/337, 029, filed Dec. 17, 2008 (published as US 2010-0150434 A1); and Ser. No. 12/640,386, filed Dec. 17, 2009 (now U.S. Pat. No. 8,175,617). Each of the above patent documents is hereby incorporated herein by reference in its entirety.

TECHNICAL FIELD

The disclosure relates generally to steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") may analyze target content to detect whether a watermark is present. In applications where the watermark encodes information (e.g., a message or payload), the reader may extract this information from a detected watermark.

A watermark embedding process may convert a message, signal or payload into a watermark signal. The embedding process may then combine the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One combination recites a method comprising: obtaining data representing video; using one or more electronic processors, embedding a first watermark signal in a first portion of the data, the first watermark signal comprising a first signal polarity; using one or more electronic processors, embedding a second watermark signal in a second portion of the data, the second watermark signal comprising a second signal polarity that is inversely related to the first signal polarity; rendering the watermarked video in real time, in which due to temporal averaging of the first watermark signal and second watermark signal over time, the first watermark signal and the second watermark signal are hidden from a human observer of the video.

Another combination includes a method comprising: obtaining data representing video; using one or more electronic processors, embedding a watermark signal in a first portion of the data, the embedding using a first embedding bump size; using one or more electronic processors, embedding a watermark signal in a second portion of the data, the embedding using a second embedding bump size, in which the first embedding bump size corresponds with a first optimal detection range distance when capturing optical scan data associated with the video as it is being rendered on a display, and the second embedding bump size corresponds with a second, larger optimal detection range distance when capturing optical scan data associated with the video as it is being rendered on the display.

Yet another combination includes a method comprising: obtaining a watermark signal; using one or more programmed electronic processors, embedding a watermark signal in a first portion of a video signal; preconditioning the watermark signal in a first manner to allow expanded detection of said preconditioned watermark signal in the face of first distortion; using one or more programmed electronic processors, embedding the watermark signal preconditioned in the first manner in a second portion of the video signal; preconditioning the watermark signal in a second manner to allow expanded detection of said preconditioned watermark signal in the face of second distortion; using one or more programmed electronic processors, embedding the watermark signal preconditioned in the second manner in a third portion of the video signal.

Still another combination recites a method comprising: receiving data representing video captured from a video display; searching the data for hidden indicia, the indicia providing information to allow a determination of video capture distance and video capture perspective; upon encountering the hidden indicia, using the information to warp the data to compensate for distortion caused by video capture distance or video capture perspective; provided the warped data to an electronic processor programmed as a steganographic indicia decoder, said decoder analyzes the warped data to decode steganographic indicia hidden in video captured from the video display.

Further combinations, aspects, features and advantages will become even more apparent with reference to the following detailed description and accompanying drawing.

BRIEF DESCRIPTION OF THE DRAWINGS

FIG. 1 represents a color image.

FIGS. 10a and 10b are block diagrams showing, respectively, an embedding process and a detection process.

FIG. 12 is a diagram showing inversely related watermark signals in two video frames.

FIG. 13 is a diagram showing image capture of rendered video.

FIG. 14 shows a representation of a watermark signal.

FIG. 15 shows a preconditioned version of the FIG. 14 watermark signal.

DETAILED DESCRIPTION

Some aspects of the following disclosure discuss a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 2:
FIG. 2 represents a first color channel ('a' channel) of the color image representation shown in FIG. 1.
Figure 3:
FIG. 3 represents a second color channel ('b' channel) of the color image representation shown in FIG. 1.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
FIG. 4 is a representation of the sum of the first color channel of FIG. 2 and the second color channel of FIG. 3 (e.g., a+b).
Figure 5:
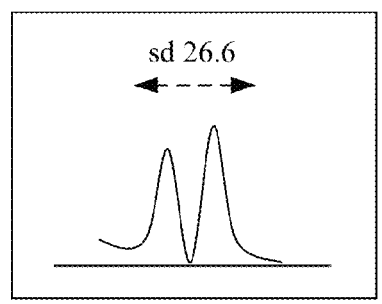
FIG. 5 is a graph showing a histogram standard deviation of FIG. 4.
Figure 6:
FIG. 6 is a representation of the difference between the first color channel of FIG. 2 and the second color channel of FIG. 3 (a−b).
Figure 7:
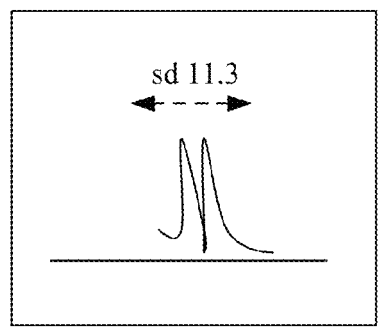
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a') In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres = WMa - WMb \quad (3)$$

$$WMres = (a+wm) - (b-wm) \quad (4)$$

$$WMres = (a-b) + 2*wm \quad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a−b)+2*wm.

Figure 8:
FIG. 8 is an image representation of the difference between the first color channel of FIG. 2 (including a watermark signal embedded therein) and the second color channel of FIG. 3 (including the watermark signal embedded therein).
Figure 9:
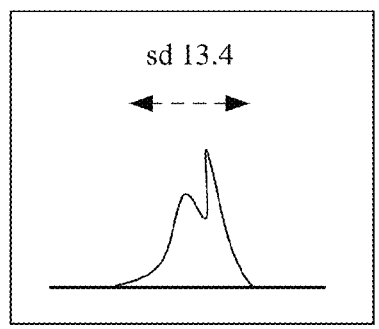
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa = a + wm \quad (6)$$

$$WMb = b + wm \quad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres = WMa + WMb \quad (8)$$

$$WMres = (a + wm) + (b + wm) \quad (9)$$

$$WMres = (a + b) + 2*wm \quad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres = WMa - WMb \quad (11)$$

$$WMres = (a + wm) - (b + wm) \quad (12)$$

$$WMres = (a - b) + \approx 0*wm \quad (13)$$

A subtraction or inverting operation in a case where a watermark signal includes the same polarity decreases image content (e.g., FIG. 4), but also significantly decreases the watermark signal. This may result in poor—if any—watermark detection.

FIGS. 10a and 10b are flow diagrams illustrating some related processes and methods. These processes may be carried out, e.g., via a computer processor, electronic processing circuitry, printer, handheld device such as a smart cell phone, etc.

With reference to FIG. 10a, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10b, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alterative color space, e.g., an RGB or CMYK color space, an image can be converted to Lab (or other color space), or appropriate weights of, e.g., RGB or CMY channels, can be used. For example, the following RGB weights may be used to calculate 'a'−'b': Chrominance Difference=0.35*R−1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
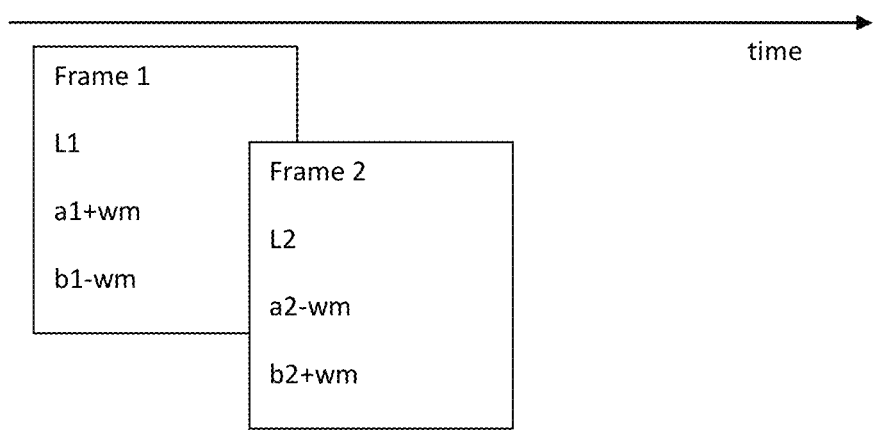
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$Det\_a = (a1 + wm) - (a2 - wm) = (a1 - a2) + 2*wm \quad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$Det\_b = (b1-wm) - (b2+wm) = (b1-b2) - 2*wm \quad (15)$$

Det_a refers to watermark detection processing of the 'b' channel. Equation 14 and 15 are then subtracted from each other as shown below in equation 16.

$$Det\_a - Det\_b = (a1 - a2 + 2*wm) - (b1 - b2 - 2*wm) \quad (16)$$
$$= (a1 - a2) - (b1 - b2) + 4*wm$$

In general, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

Improving Watermark Imperceptibility

With reference to FIG. 12, two watermark signals (or components), $W_1$ and $W_2$, are shown relative to two video frames ($f_1$ and $f_2$) over time. Of course, video will likely include many more frames, and illustration of just a portion of such frames is not intended to be limiting.

$W_1$ and $W_2$ preferably carry the same payload or message. In terms of signal characteristics, however, $W_1$ and $W_2$ are preferably inversely related to one another. For example, their signal polarity is inversely related. Instead of two (2) watermark signals, a single watermark signal can be used. When using a single signal, however, the signal polarity is preferably inversely alternated between video frames.

The human eye performs temporal averaging of the watermark signals $W_1$ and $W_2$ as they are rendered for viewing. That is, when looking at sequential presentment of frames f1 and f2, the human eye/mind averages the two signals, effectively canceling them out, since they include inversely related polarities. Another way to view this effect is to consider signal adjustments or "tweaks". Recall from above that a digital watermark signal can be introduced into media content by altering data representing audio or video or imagery. If $W_1$ introduces a positive (+) tweak or alteration in f1, then to achieve the favorable temporal averaging, $W_2$ preferably introduces a corresponding negative (-) tweak or alteration in f2. These changes are preferably consistent from the first frame to the second frame. That is, if watermark changes are introduced to a first spatial area (or first set of coefficients) in the first frame, an inverse change is made to a corresponding spatial area (or coefficients) in the second frame.

Thus, the perceived perceptibility with temporal averaging=$W_1-W_2 \approx 0$.

A programmed electronic processor (or multiple processors) embeds video accordingly.

A watermark detector is used to read the watermarking as watermarked video is rendered. For example, the watermarked video is rendered on a display such as a computer monitor, TV or cell phone display (e.g., Apple's iPhone). A camera or video camera can be used to capture imagery (e.g., streaming mode capture). Captured imagery is provided to a watermark detector which analyses captured imagery. For example, the watermark detector preferably analyzes a single video frame to decode the watermarking there from.

A mobile device (e.g., an iPhone) executing a watermark detector application may be used for such a watermark detector. Mobile devices are increasingly shipped with high quality video cameras. Of course, there are many other suitable devices besides the iPhone that can serve as watermark detectors.

Additional methods are now provided to improve a user's experience when trying to read a watermark from displayed or rendered video.

A user points a camera (e.g., included in a mobile device such as the iPhone) at a display and starts video capture (see FIG. 13). There is a "sweet" spot in terms of image capture distance and image capture perspective angle to position the camera relative to the display to avoid positional distortion. If the camera is positioned too far away or at too great an angle relative to the display then the watermarking may not be detectable. Distance and angle introduce signal distortion (e.g., scale, rotation, translation) which may deter watermark reading.

One approach is to increase a watermark's tolerance to image capture range and perspective angle. A watermark can be adjusted to increase detection tolerances. For example, an embedding area or "bump" can be adjusted to allow for increased image capture range. (An embedding area or bump refers to a host signal area or other characteristics at which a signal alteration is introduced to represent at least some portion of a watermark signal.)

If an embedding bump covering a 2×2 pixel area (4 pixels) corresponds to a sweet spot range of 4-8 inches, then doubling the bump size eight pixels to will increase the sweet spot range to about 16 inches. (The specific number and embedding details are not intended to be limiting, and are provided as examples only.)

Multiple bump sizes can be used when embedding watermarking in a video sequence to provide an extended image capture range. For example, consider the following frames and bump sizes:

| Frame 1 | Frame 2 | Frame 3 | Frame 4 | Frame 5 | Frame 6 | Frame 7 | Frame 8 |
|---------|---------|---------|---------|---------|---------|---------|---------|
| Bump 1  | Bump 1  | Bump 2  | Bump 2  | Bump 1  | Bump 1  | Bump 2  | Bump 2  |

A first pair of frames is embedded at a first bump size, and a second pair of frames is embedded at a second bump size, and so on. This will allow an extended image capture range corresponding to both bump sizes as the video is rendered. At a frame rate of 25 frames/second or higher, the user will experience quicker detection rates and lower frustration as she positions the camera relative to the display.

Of course, three or more embedding bump sizes may be used to even further extend the image capture range. And, three or more frames may be grouped together instead of using pairs.

Now let's consider image capture perspective (see FIG. 13). The ideal image capture would be a parallel vantage point directly in front of the display screen. But the ideal is not always possible. For example, a user may hold their camera at an angle relative to the display when capturing video of the display. This may introduce distortion which may hamper watermark detection.

One approach is to precondition the watermark signal to allow for a wider range of perspective angle image capture while still allowing for watermark detection. For example, if a watermark signal can typically be read over the range of +/−5 degrees perspective angle distortion, preconditioning the watermark signal prior to embedding to +/−10 degrees on some video frames allows the image capture perspective range to be extended to approximately +/−15 degrees. For example a perspective filter can be set to a certain horizontal perspective, and the watermark signal may be passed through the filter.

By way of example, please consider a watermark signal represented by a set of, e.g., horizontal lines as shown in FIG. 14. This signal is taken and preconditioned to approximate a horizontal distortion of −10 degrees as shown in FIG. 15. When this preconditioned watermark signal is viewed by a camera at a perspective angle of +10 degrees, the resultant captured image approximates the original signal in FIG. 14. That is, the preconditioning coupled with an off-center read effectively cancels out the perspective angle distortion.

By way of example, this precondition can be alternated in frames as shown below:

| Frame 1 | Frame 2 | Frame 3 | Frame 4 | Frame 5 | Frame 6 | Frame 7 | Frame 8 |
|---------|---------|---------|---------|---------|---------|---------|---------|
| No change | No change | −10 degrees | −10 degrees | +10 degrees | +10 degrees | No change | No change |

A first pair of frames is embedded without any preconditioning, a second pair of frames is embedded with a precondition signal at −10 degrees perspective, and a third pair of frames is embedded with a preconditioned signal at +10 degrees perspective, and so on. This will allow an extended image capture perspective angle range as the video is rendered. At a frame rate of 25 frames/second or higher, the user will experience quicker detection rates and lower frustration as she positions the camera relative to the display.

Of course, additional angle preconditioning can be used, with different embedding intervals, over a different number of frame pairs/triplets/quads, etc. as well. Also, while we have used ±10 degrees, the preconditioning can cover a range of values, e.g., over ±5±20 degrees.

Moreover, both perspective preconditioning and embedding bump sizes can be combined to yield both increased range and perspective changes. For example:

| 1st Frame Pair | 2nd Frame Pair | 3rd Frame Pair | 4th Frame Pair | 5th Frame Pair | 6th Frame Pair |
|---|---|---|---|---|---|
| Bump size 1; No precondition | Bump size 1; +10 degrees precondition | Bump size 1; −10 degrees precondition | Bump size 2; No precondition | Bump size 2; +10 degrees precondition | Bump size 1; −10 degrees precondition |

Of course, other combinations involving both bump size and preconditions can be used as well. In some cases the so-called "I" frames are used as a starting reference for bump size and/or preconditioning. Sequences can be renewed or altered when an I frame is encountered.

As discussed further in assignee's U.S. patent application Ser. No. 12/640,386 (now U.S. Pat. No. 8,175,617), hereby incorporated herein by reference in its entirety, target patterns may be included in a scene from which, e.g., the distance to, and orientation of, surfaces within the viewing space can be discerned. Such targets thus serve as beacons, signaling distance and orientation information to a camera system. One such target is the TRIPcode, detailed, e.g., in de Ipiña, TRIP: a Low-Cost Vision-Based Location System for Ubiquitous Computing, Personal and Ubiquitous Computing, Vol. 6, No. 3, May, 2002, pp. 206-219.

Figure 16:
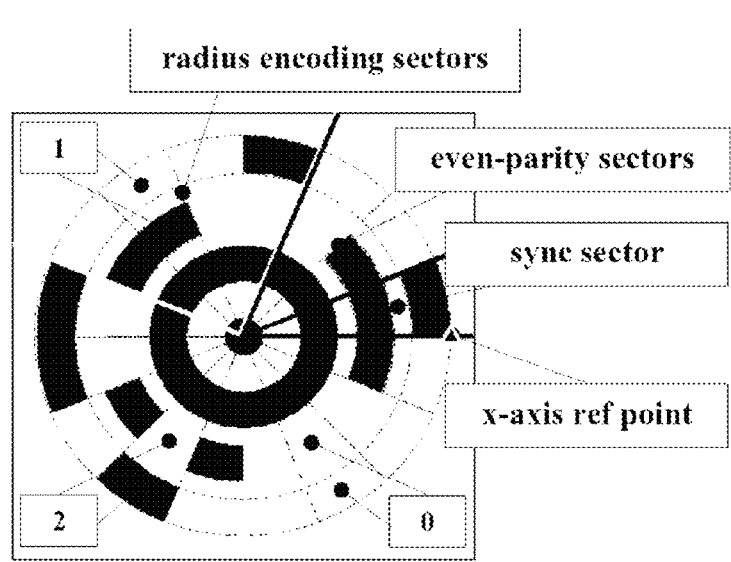
FIG. 16 shows a graphical target, which can be used to provide information associated with image capture distance and image capture perceptive angle.

As detailed in the Ipiña paper, the target (shown in FIG. 16) encodes information including the target's radius, allowing a camera-equipped system to determine both the distance from the camera to the target, and the target's 3D pose. If the target is positioned on a surface in the viewing space (e.g., on a wall), the Ipiña arrangement allows a camera-equipped system to understand both the distance to the wall, and the wall's spatial orientation relative to the camera.

It may be advantageous to conceal the presence of such TRIPcodes. One camouflage method relies on the fact that color printing is commonly performed with four inks: cyan, magenta, yellow and black (CMYK). Normally, black material is printed with black ink. However, black can also be imitated by overprinting cyan and magenta and yellow. To humans, these two techniques are essentially indistinguishable. To a digital camera, however, they may readily be discerned. This is because black inks typically absorb a relatively high amount of infrared light, whereas cyan, magenta and yellow channels do not.

The arrangement just described can be adapted for use with any color printed imagery—not just black regions. Details for doing so are provided in U.S. Pat. No. 7,738,673, which is hereby incorporated herein by reference in its entirety. By such arrangements, TRIPcode targets can be concealed or hidden from human view wherever printing may appear in a visual scene, allowing accurate measurement of certain features and objects within the scene by reference to such targets.

A hidden TRIPcode may be advantageously used to improve watermark detection. For example, a hidden TRIPcode may be encoded in video prior to rendering on a display. A mobile phone or other camera captures video of the display rendering the encoded video. The mobile phone analyzes the captured video to discern details from the TRIPcode. These details include information to allow the mobile phone to discern an image capture range and image capture perspective angle. Armed with this information, the mobile phone warps (e.g., alters or transforms) the captured video to compensate for image capture distance and perspective angle. This warping counteracts the effects of distance and perspective changes. This warped video is then provided to a watermark detector. From the watermark detector's perspective, the video is (relatively) distortion free. The detector searches for a watermark in the warped video.

Although it could be, a TRIPcode (or other target pattern) need not be placed in every video frame. In fact, such a tool could be placed every 10 or more frames. In one embodiment, the watermark detection processes is not initiated until a TRIPcode (or other target pattern) is found. The video data is warped to compensate for distortion, and the warped video is then presented to the watermark detector.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, even if cited above in connection with specific of their teachings. These documents disclose technologies and teachings that can be incorporated into the arrangements detailed herein, and into which the technologies and teachings detailed herein can be incorporated.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a multi-purpose electronic processor, parallel processors or cores, and/or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by an electronic processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments are exemplary only; the interchanging and substitution of these teachings with other teachings in this and the incorporated-by-reference patents are also contemplated.

What is claimed is:

1. An apparatus comprising:
means for storing data representing video;
means for embedding a first watermark signal in a first portion of stored data, the first watermark signal comprising a first signal polarity and corresponding to first detection preconditioning;
means for embedding a second watermark signal in a second portion of the stored data, the second watermark signal comprising a second signal polarity that is inversely related to the first signal polarity and corresponding to second detection preconditioning;
means for controlling provision of the watermarked video for display in real time, in which temporal averaging of the first watermark signal and second watermark signal over time conceals the first watermark signal and the second watermark signal from a human observer of the video.

2. The apparatus of claim 1 in which the first watermark signal and the second watermark signal are embedded in corresponding spatial positions of the video.

3. A mobile device comprising the apparatus of claim 1.

4. An apparatus comprising:
means for storing data representing video;
means for embedding a watermark signal in a first portion of stored data, the embedding using a first embedding bump size;
means for embedding a watermark signal in a second portion of the stored data, the embedding using a second embedding bump size, in which the first embedding bump size corresponds with a first detection range distance when capturing optical scan data associated with the video as it is being rendered on a display, and the second embedding bump size corresponds with a second, larger detection range distance when capturing optical scan data associated with the video as it is being rendered on the display;
means for controlling provision of the watermarked video to a display.

5. The apparatus of claim 4 in which use of both the first embedding bump size and the second embedding bump size extends the detection range distance when capturing optical scan data associated with the rendered video.

6. The apparatus of claim 4 in which the optical scan data comprises video data captured from a means for displaying that is rendering the video.

7. The apparatus of claim 4 in which the first portion of the data comprises two or more video frames.

8. The apparatus of claim 7 in which the second portion of the data comprises two or more video frames.

9. A mobile device comprising the apparatus of claim 4.

10. An apparatus comprising:
means for storing a watermark signal;
means for embedding a watermark signal in a first portion of a video signal;
means for preconditioning the watermark signal in a first manner to allow expanded detection of said preconditioned watermark signal in the presence of first distortion;
means for embedding the watermark signal preconditioned in the first manner in a second portion of the video signal;
means for preconditioning the watermark signal in a second manner to allow expanded detection of said preconditioned watermark signal in the presence of second distortion;
means for embedding the watermark signal preconditioned in the second manner in a third portion of the video signal.

11. The apparatus of claim 10 in which the first distortion is due to positive image capture perspective angle variance.

12. The apparatus of claim 11 in which the second distortion is due to negative image capture perspective angle variance.

13. The apparatus of claim 12 in which image capture perspective angle variance is introduced by a mobile device capturing imagery of a display that is rendering the watermarked video signal.

14. The apparatus of claim 11 in which image capture perspective angle variance is introduced by a mobile device capturing imagery of a means for displaying that is rendering the watermarked video signal.

15. The apparatus of claim 10 in which embedding the watermark signal preconditioned in the first manner in a second portion of the video signal uses a first embedding bump size; and in which embedding the watermark signal preconditioned in the second manner in a third portion of the video signal uses a second embedding bump size; and in which the first embedding bump size corresponds with a first optimal detection range distance when capturing optical scan data associated with the video signal as it is being rendered on a display, and the second embedding bump size corresponds with a second, larger optimal detection range distance when capturing optical scan data associated with the video signal as it is being rendered on the display.

16. A mobile device comprising the apparatus of claim 10.

* * * * *